(12) United States Patent
Wachi et al.

(10) Patent No.: US 6,282,896 B1
(45) Date of Patent: Sep. 4, 2001

(54) IDLE STROKE SHORTENING DEVICE IN BRAKE SYSTEM

(75) Inventors: Yuji Wachi; Shogo Ogino; Isao Kobayashi, all of Higashimatsuyama (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/547,039

(22) Filed: Apr. 11, 2000

(30) Foreign Application Priority Data

May 10, 1999 (JP) .................................................. 11-128845
Feb. 28, 2000 (JP) .................................................. 12-051393

(51) Int. Cl.⁷ .................................................. B60T 13/00
(52) U.S. Cl. ........................... 60/547.2; 60/560; 60/574; 60/594; 91/382; 91/376 R
(58) Field of Search ................. 60/597.1, 560, 60/574, 594; 91/382, 376 R

(56) References Cited

U.S. PATENT DOCUMENTS 4,656,923 * 4/1987 Tsuyuki et al. ...................... 91/369.1
4,665,701 * 5/1987 Bach ................................... 60/547.1

* cited by examiner

Primary Examiner—Edward K. Look
(74) Attorney, Agent, or Firm—Kanesaka & Takeuchi

(57) ABSTRACT

A brake system 1 of the invention comprises a brake pedal 2, a booster 3 which boosts the input force applied by the brake pedal 2 and outputs the boosted force, a travel amplifying mechanism 4 which amplifies the travel of an output shaft of the booster 3 and outputs the amplified travel, a master cylinder 5 which develops master cylinder pressure when the output from the travel amplifying mechanism 4 is applied to the master cylinders 5, and wheel cyclinders 6 which develop braking forces when the master cyclinder pressure is introduced into the wheel cyclinders. By the travel amplifying mechanism 4, the travel of the brake pedal 3 in the initial stage of operation is amplified by the travel amplifying mechanism and is then transmitted to the master cylinder 5, whereby the idle stroke of the operating member caused by various idle portions in stroke in the brake system can be effectively shortened.

7 Claims, 11 Drawing Sheets

OPERATIVE STATE

OPERATIVE STATE (a)

(b)

(a)

(b)

(c)

(d)

(e)

(f)

INOPERATIVE STATE

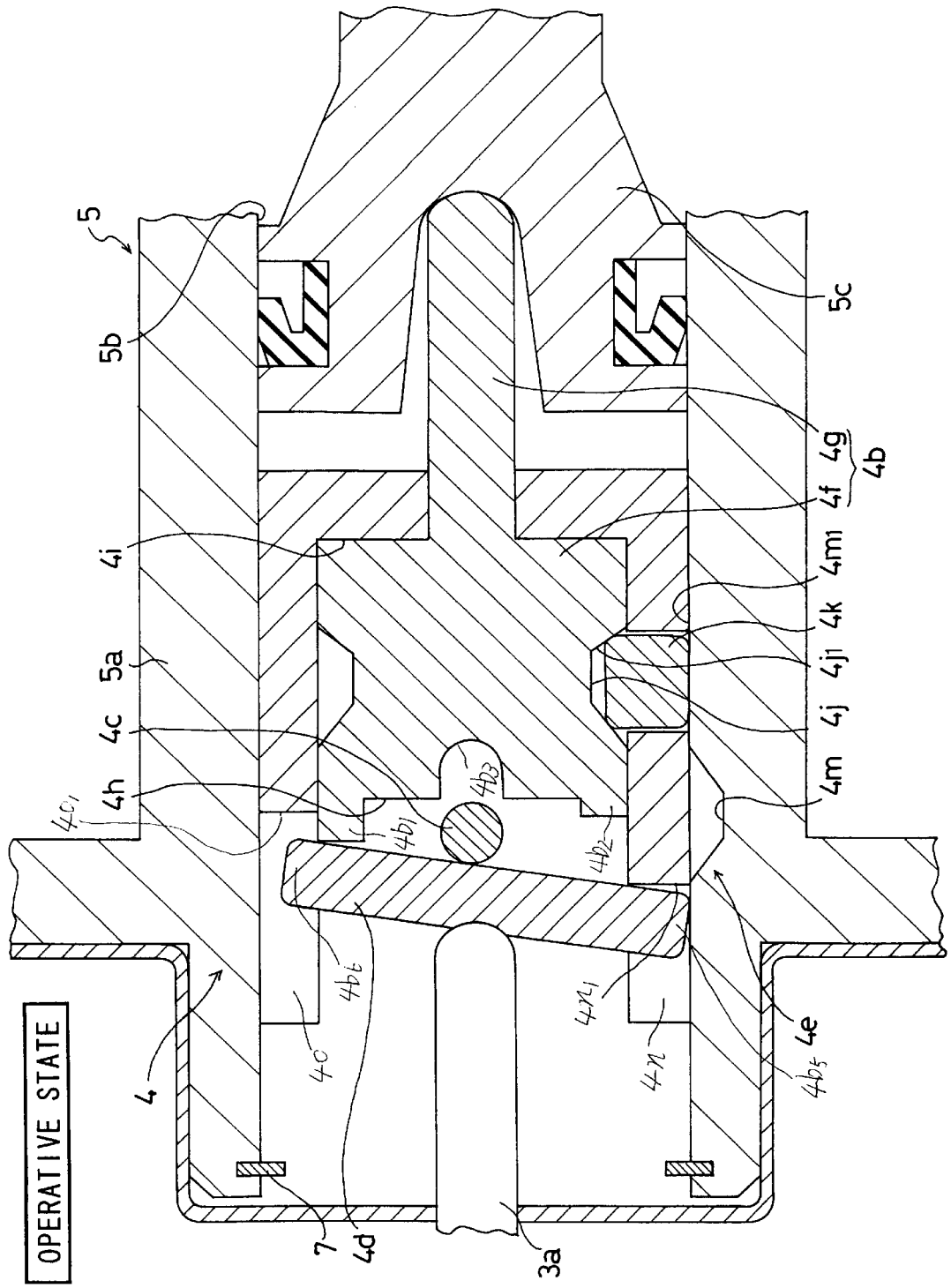

IDLE STROKE SHORTENING DEVICE IN BRAKE SYSTEM

BACKGROUND OF THE INVENTION

The present invention relates to an idle stroke shortening device in a brake system for shortening the idle stroke existing in the brake system.

It should be noted that the term "idle stroke" means an idling portion (idle portions) in stroke.

In brake systems employed in various machines and apparatus including vehicles such as automobiles, idle stroke generally exists. The idle stroke is composed of idling portions including a space of a control valve of a brake booster until the control valve is switched, a travelling distance of an output piston of a master cylinder until a hydraulic chamber of the master cylinder is shut off a reservoir, and a traveling distance until wheel cylinders produce braking force of a foundation brake.

The existence of the idle stroke in the brake system makes the stroke of a brake pedal longer.

SUMMARY OF THE INVENTION

The object of the present invention is to provide an idle stroke shortening device in a brake system for shortening the stroke of an operational member even when idle traveling distances exist in the brake system.

For accomplishing the object, in a brake system including an operating member, a master cylinder which is actuated by operation of the operating member to develop master cylinder pressure, and a brake cylinder which develops braking force when the master cylinder pressure is introduced into the brake cylinder, the present invention is characterized by an idle stroke shortening device comprising a travel amplifying mechanism arranged between said operating member and said master cylinder, wherein the travel of said operating member is transmitted to said master cylinder after amplified by said travel amplifying mechanism.

The present invention is characterized in that the brake system includes a booster arranged between said operating member and said master cylinder to boost input force applied by said operating member and output the boosted force to said master cylinder, and wherein said travel amplifying mechanism is arranged between said booster and said master cylinder.

The present invention is further characterized in that said travel amplifying mechanism comprises: a cylindrical cylinder piston which is slidably fitted in an axial hole of said master cylinder; a travel amplifying piston which is slidably fitted in said cylinder piston to press an output piston of said master cylinder; a lever which is supported to said cylinder piston in such a manner as to pivot forward when the travel amplifying mechanism is operative and to pivot rearward when the travel amplifying mechanism is inoperative about one end thereof as a support, or is supported to said cylinder piston in such a manner as to pivot forward about one end as a support after moving forward a first preset travel relative to said cylinder piston when the travel amplifying mechanism is operative and to move rearward for said first preset travel relative to said cylinder piston after pivoting rearward about the end when the travel amplifying mechanism is inoperative, wherein the other end of the lever is in contact with an rear end of said travel amplifying piston and wherein output of said booster is applied to a portion between said one end and said the other end; and a cylinder piston control means which engages said cylinder piston with an inner wall of said axial hole for the slidable fitting of said cylinder piston to block the movement of said cylinder piston when it is in the inoperative position and releases the blockage of the movement of said cylinder piston when said travel amplifying piston moves a second preset travel relative to said cylinder piston.

Furthermore, the present invention is characterized in that the brake system includes a booster arranged between said operating member and said master cylinder to boost input force applied by said operating member and output the boosted force to said master cylinder, and wherein said travel amplifying mechanism is arranged between said operating member and said booster.

In addition, the present invention is characterized in that said travel amplifying mechanism comprises: a cylindrical cylinder piston which is slidably fitted in an axial hole of said booster; a travel amplifying piston which is slidably fitted in said cylinder piston and is connected to an operating rod for switching and controlling the control valve of said booster; a lever which is supported to said cylinder piston in such a manner as to pivot forward when the travel amplifying mechanism is operative and to pivot rearward when the travel amplifying mechanism is inoperative about one end thereof as a support, or is supported to said cylinder piston in such a manner as to pivot forward about one end as a support after moving forward a first preset travel relative to said cylinder piston when the travel amplifying mechanism is operative and to move rearward for said first preset travel relative to said cylinder piston after pivoting rearward about the end when the travel amplifying mechanism is inoperative, wherein the other end of the lever is in contact with an rear end of said travel amplifying piston and wherein input force applied by said operating member is applied to a portion between said one end and said the other end; and a cylinder piston control means which engages said cylinder piston with an inner wall of said axial hole for the slidable fitting of said cylinder piston to block the movement of said cylinder piston when it is in the inoperative position and releases the blockage of the movement of said cylinder piston when said travel amplifying piston moves a second preset travel relative to said cylinder piston.

The present invention is further characterized in that said first preset travel is set larger than the travel of said operating rod until the control valve of said booster is switched.

Furthermore, the present invention is characterized in that said cylinder piston control means comprises an engaging member radially movably supported in said cylinder piston and a groove formed in the inner wall of said axial hole, wherein said engaging member in the inoperative position is disposed between said cylinder piston and said groove to block the movement of said cylinder piston and, when said travel amplifying piston moves said second preset travel relative to said cylinder piston, said engaging member moves radially to come off said groove, thereby releasing the blockage of the movement of said cylinder piston. In the idle stroke shortening device in the brake system of the present invention structured as mentioned above, the travel of the operating member is amplified in the initial state of operation by the travel amplifying mechanism and is then transmitted to the master cylinder, whereby the idle stroke of the operating member caused by various idle portions in stroke in the brake system can be effectively shortened.

Particularly, according to the present invention, the travel amplifying mechanism can be relatively simply structured just by using a lever, two pistons, and an engaging member.

In addition, according to the present invention, the function of amplifying the travel of the operating member by the travel amplifying mechanism is not started until the control valve of the booster is switched and is started after the control valve is switched. Therefore, the force required for operating the brake pedal is not increased until the control valve is switched, thus preventing heavy operation of the brake pedal.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 8(a)–8(f) are views for exploded components of the idle stroke shortening device of the second embodiment shown in FIG. 7, in which FIG. 8(a) is a front view of a travel amplifying piston 4b, FIG. 8(b) is a sectional view taken along a line VIIIB—VIIIB of FIG. 8(a), FIG. 8(c) is a front view of a cylinder piston 4a, FIG. 8(d) is a sectional view taken along a line VIIID—VIIID of FIG. 8(c), FIG. 8(e) is a front view of a lever 4d, FIG. 8(f) is a sectional view taken along a line VIIIF—VIIIF of FIG. 8(e);

FIG. 11 is a partially sectional view schematically showing the idle stroke shortening device shown in FIG. 10 in its operative state.

DESCRIPTION OF THE PREFERRED EMBODIMENTS

Hereinafter, embodiments of the present invention will be described with reference to drawings.

Figure 1:
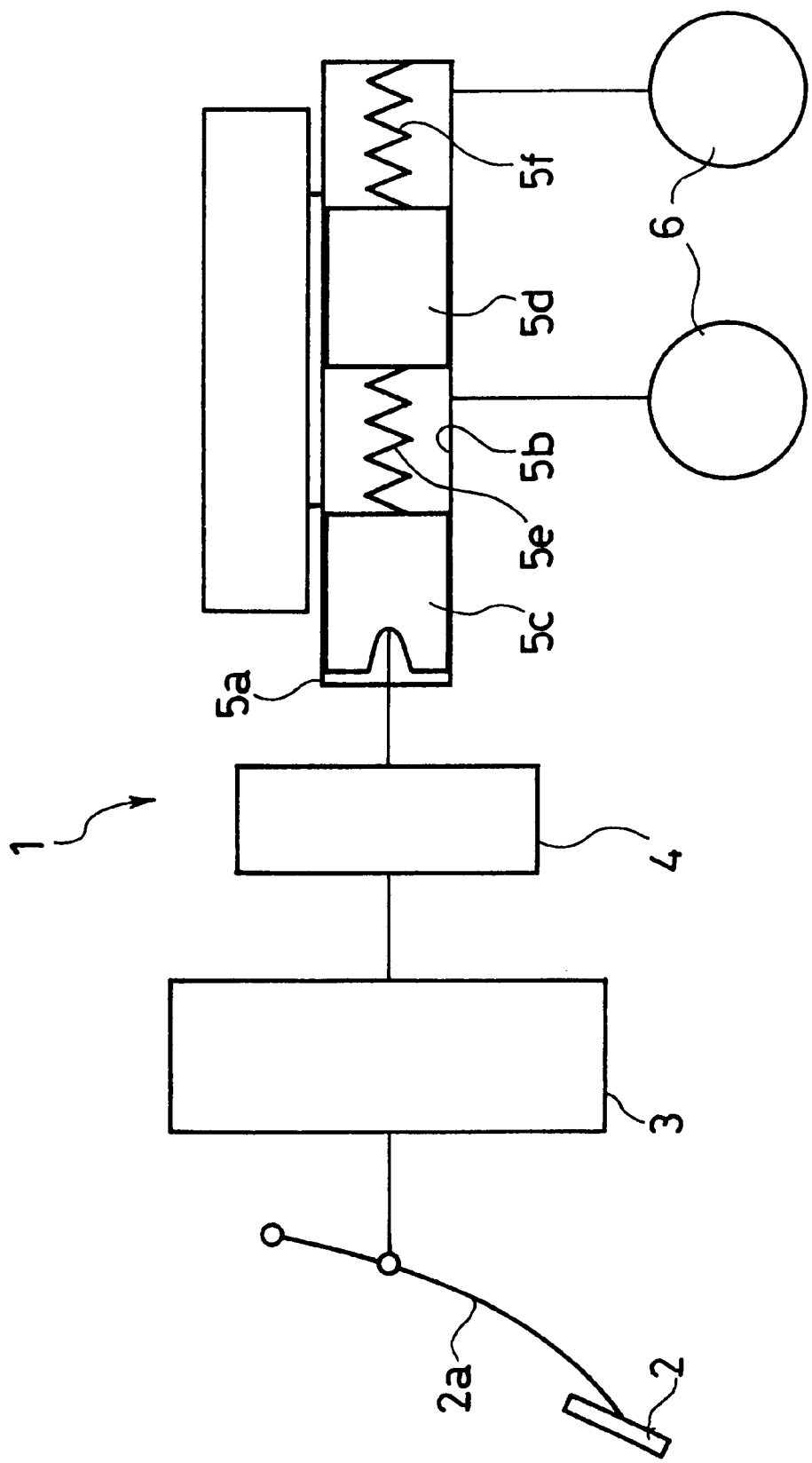
FIG. 1 is a view schematically showing an example of the basic structure of an idle stroke shortening device in a brake system according to the present invention.

FIG. 1 is a view schematically showing an example of the basic structure of an idle stroke shortening device in a brake system according to the present invention. In the description with regard to FIGS. 1 through 4, "front" corresponds to the right in any of the drawings and "rear" corresponds to the left in any of the drawings. As shown in FIG. 1, the basic structure of a brake system 1 with an idle stroke shortening device of the present invention comprises a brake pedal 2 as the operational member of the present invention, a booster 3 which is actuated by operation or depression of the brake pedal 2 and boosts the input force applied by the brake pedal 2 into a predetermined force, a travel amplifying mechanism 4 for amplifying the travel of an output shaft of the booster 3, a master cylinder 5 which is actuated by the travel of the output shaft amplified by the travel amplifying mechanism 4 to develop master cylinder pressure, and wheel cylinders 6 into which the master cylinder pressure of the master cylinder 5 is introduced to develop braking force.

The booster 3 may be a conventional one which boosts the input force applied by the brake pedal by using a power source such as negative pressure, hydraulic pressure, compressed air, or electromagnetic force. The master cylinder 5 may also be a conventional one of a tandem-type as shown in the drawings or of a single-type. The wheel cylinder 6 may also be a conventional one.

Figure 2:
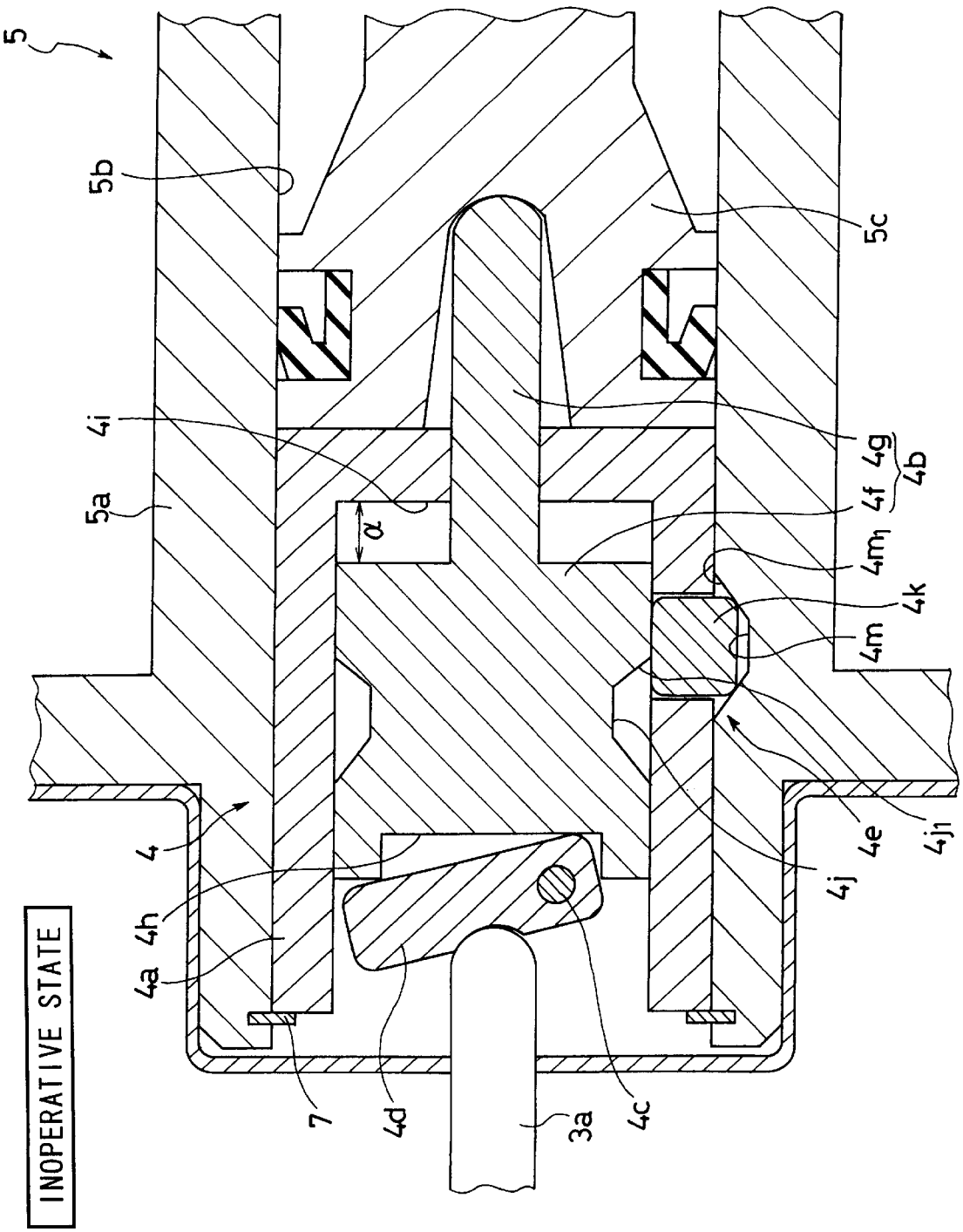
FIG. 2 is a partial sectional view of an idle stroke shortening device of a first embodiment according to the present invention in the brake system shown in FIG. 1, schematically showing the device in the inoperative state.

FIG. 2 is a view of an idle stroke shortening device of a first embodiment according to the present invention in the brake system shown in FIG. 1, partially and schematically showing the device in the inoperative state.

As shown in FIG. 2, the travel amplifying mechanism 4 is arranged within a housing 5a of the master cylinder 5 and comprises a cylindrical cylinder piston 4a which is slidably disposed in an axial hole 5b of the master cylinder 5 and is positioned at the rear end of a primary piston (corresponding to the output piston of the present invention) 5c of the master cylinder 5, a travel amplifying piston 4b which is slidably disposed in the cylinder piston 4a, a lever 4d of which one end is pivotally supported to the cylinder piston 4a by a pin 4c and the other end is in contact with the rear end of the travel amplifying piston 4b and in which the front end of an output shaft 3a of the booster 3 is in contact with a middle portion of the lever 4d between the pin 4c and the contact point with the travel amplifying piston 4b, and a cylinder piston control means 4e which engages the cylinder piston 4a with the housing 5a of the master cylinder 5 to block the movement of the cylinder piston 4a in the inoperative state shown in FIG. 2 and release the blockage of the movement of the cylinder piston 4a when the travel amplifying piston 4b travels a predetermined distance relative to the cylinder piston 4a.

In the inoperative state, the cylinder piston 4a is sandwiched between the primary piston 5c at its inoperative position and a stopper ring 7 attached to the housing 5a.

The travel amplifying piston 4b comprises a piston portion 4f and a piston rod 4g projecting from the center of the piston portion 4f toward the front. The piston portion 4f is formed with a concavity 4h at the rear end thereof. In the inoperative state shown in FIG. 2, the front end of the piston rod 4g is in contact with the primary piston 5c and the supported end of the lever 4d enters in the concavity 4h and is in contact with the piston portion 4f. Also in the inoperative state, a predetermined space α exists between the front end of the piston portion 4f and a stopper portion 4i at the front end of a cylinder hole of the cylinder piston 4a.

The cylinder piston control means 4e is composed of a groove 4j which is formed in the outer peripheral surface of the piston portion 4f of the travel amplifying piston 4b and has slant side walls of the longitudinal direction, an engaging member 4k composed of, for example, a key which is disposed in the cylinder piston 4a movably in the radial direction, and a groove 4m which is formed in the inner peripheral surface of the axial hole 5b of the housing 5a and has slant side walls disposed on the front and rear sides. In this case, in the inoperative state shown in FIG. 2, the center in the axial direction of the engaging member 4k coincides with the center in the axial direction of the groove 4m of the housing 5a while the center in the axial direction of the groove 4j of the piston portion 4f is shifted rearward from the center in the axial direction of the engaging member 4k by substantially the same distance as the space α. Therefore, in the inoperative state, the engaging member 4k is partially pressed by the outer surface of the piston portion 4f in the radial outward direction of the cylinder piston 4a in such a manner as to enter in the groove 4m of the housing 5a and come in contact with the slant side walls of the groove 4m.

In the idle stroke shortening device of the brake system of the first embodiment structured as mentioned above, in the inoperative state where the brake pedal 2 is not depressed, the booster 3 outputs no force. Also the travel amplifying mechanism 4 and the master cylinder 5 do not operate so that no master cylinder pressure is developed. Accordingly, the wheel cylinders 6 develop no braking force, thereby not performing braking action.

Figure 3:
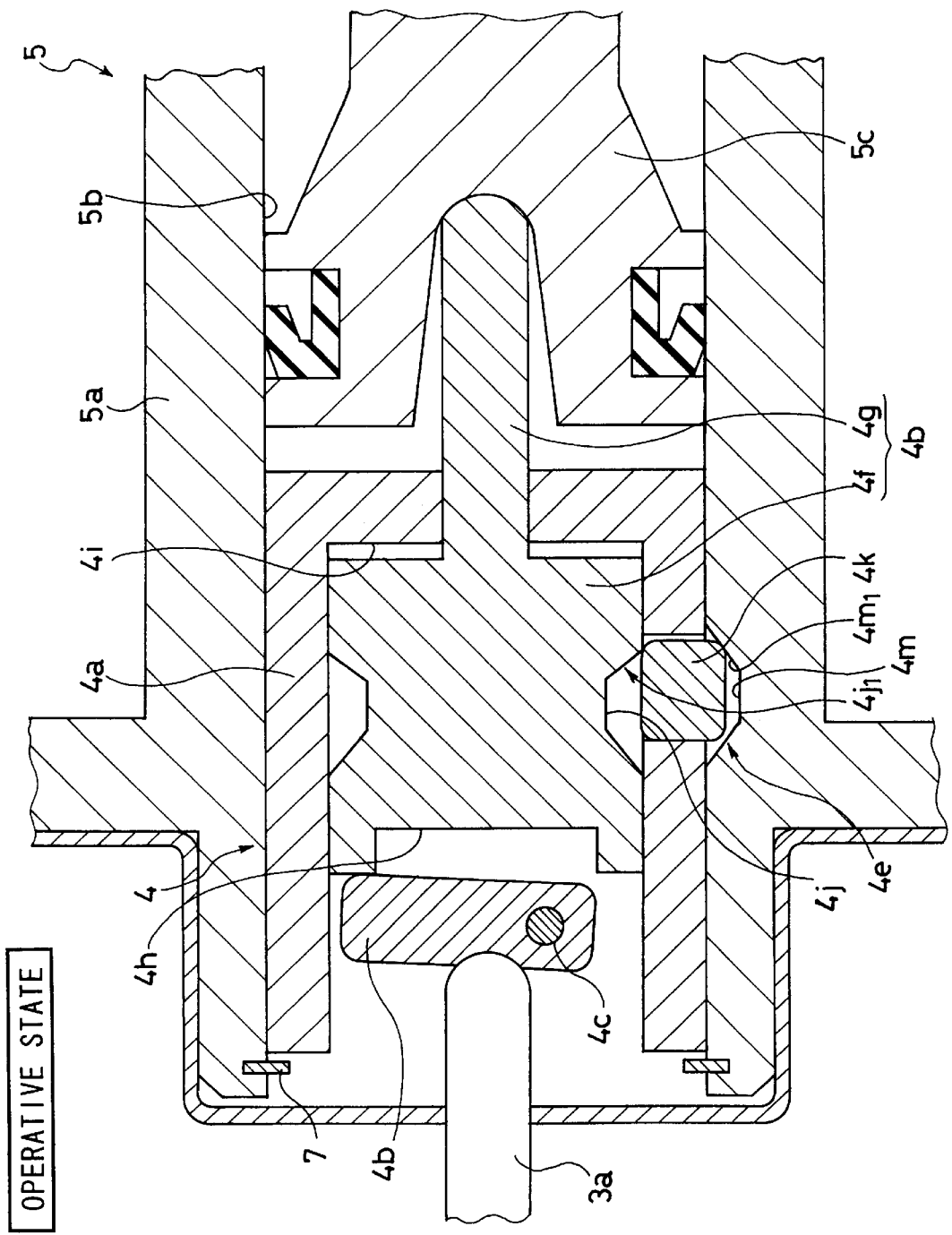
FIG. 3 is a partial sectional view schematically showing the idle stroke shortening device shown in FIG. 2 in the initial state of operation.
Figure 4:
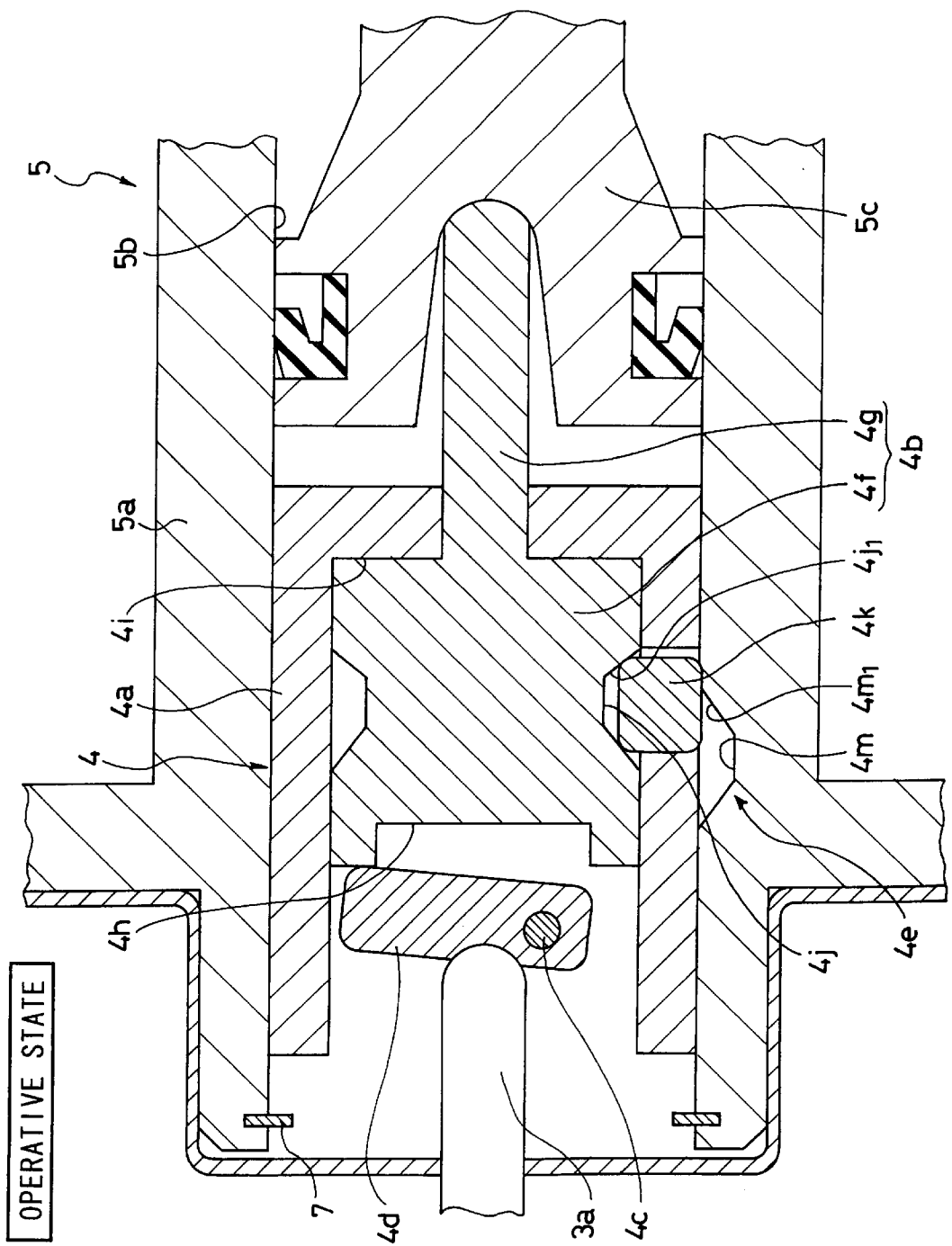
FIG. 4 is a partial sectional view schematically showing the idle stroke shortening device shown in FIG. 2 in its operative state.

Upon depression of the brake pedal 2 for braking operation, the booster 3 boosts the input force applied by the brake pedal 2 into predetermined value as previously known in the art, so the output shaft 3a travels forward to press the lever 4d. Then, the cylinder piston 4a is pressed forward via the lever 4d. Since the engaging member 4k enters in the groove 4m of the housing 5a, the cylinder piston 4a does not move. Therefore, as shown in FIG. 3, the lever 4d pivots about the pin 4c in the clockwise direction and the travel amplifying piston 4f moves forward relative to the cylinder piston 4a. Then, the primary piston 5c of the master cylinder 5 moves forward and the secondary piston 5d then moves forward. At this point, the travel of the travel amplifying piston 4f is amplified by a leverage, i.e. a lever ratio, of the lever 4d about the pin 4c, so the travels of the primary piston 5c and the secondary piston 5d are also amplified. In this way, the travel amplifying function of the travel amplifying mechanism is started. Until the booster 3 outputs through the output shaft 3a even when the brake pedal 2 is depressed, the stroke amplifying mechanism 4 does not perform the stroke amplifying function.

Then the front-side side wall $4j_1$ of the groove 4j of the piston portion 4f reaches the front end of the engaging member 4k. Therefore, the engaging member 4k is allowed to move in the radial inward direction of the cylinder piston 4a so as to release the blockage of movement of the cylinder piston 4a. The cylinder piston 4a is pressed forward to move forward. Since the engaging member 4k is also pressed forward, the engaging member 4k gradually moves in the radial inward direction of the cylinder piston 4a while being guided by the front-side side wall $4m_1$ of the groove 4m of the housing 5a after the blockage of the cylinder piston 4a is released. As a result of this, the cylinder piston 4a also gradually moves forward.

As the travel amplifying piston 4b moves a predetermined travel to kill the space α, the front end of the piston portion 4f comes in contact with the stopper portion 4i of the cylinder piston 4a. As a result, the cylinder piston 4a and the lever 4d move forward integrally with the travel amplifying piston 4b. In this way, the travel amplifying function of the travel amplifying mechanism 4 is terminated. At this point, the center in the axial direction of the groove 4j of the piston portion 4f coincides with the center in the axial direction of the engaging member 4k, so the engaging member 4k completely radially comes off the groove 4m of the housing 5a and enters into the groove 4j of the travel amplifying piston 4b, whereby the cylinder piston 4a and the travel amplifying piston 4b are joined to each other by the engaging member 4k. After that, since the engaging member 4k lies among the inner surface of the axial hole 5b of the housing 5a and the side walls in the longitudinal direction of the groove 4j of the travel amplifying piston 4b, the engaging member 4k does not radially move relative to the cylinder piston 4a and the travel amplifying piston 4b.

In this manner, in the initial stage, the travels of the primary piston 5c and the secondary piston 5d are amplified relative to the travel of the brake pedal 2 by the travel amplifying mechanism 4 in comparison to a normal conventional one without such a travel amplifying mechanism 4. Therefore, the idle stroke of a brake system from the master cylinder 5a to the wheel cylinders 6 can be cancelled by a relatively short travel of the brake pedal 2, thereby quickly actuating the brakes.

As the brake pedal 2 is released, the booster 3 does not output so that both the primary piston 5c and the secondary piston 5d of the master cylinder 5 are moved rearward by spring forces of a primary return spring 5e and a secondary return spring 5f of the master cylinder 5. Accordingly, the cylinder piston 4a and the travel amplifying piston 4b are also moved rearward together. As the front end of the engaging member 4k reaches a section facing the groove 4m of the housing 5a, the cylinder piston control means 4e is allowed to start the blocking action. Then, the engaging member 4k is guided by the front-side side wall $4j_1$ of the groove 4j of the travel amplifying piston 4b to gradually move in the radial outward direction of the cylinder piston 4a whereby the blocking action by the cylinder piston control means 4e to block the movement of the cylinder piston 4a is started.

Accordingly, the lever 4d pivots about the pin 4c in the counter-clockwise direction and the front end of the piston portion 4f is separated from the stopper portion 4i of the cylinder piston 4a. As the rear end of the primary piston 5c comes in contact with the front end of the cylinder piston 4a, the cylinder piston 4a is moved rearward together with the primary piston 5c. As the rear end of the cylinder piston 4a then comes in contact with the stopper ring 7, the cylinder piston 4a, the travel amplifying piston 4b, the primary piston 5c and the secondary piston 5d return into the inoperative state as shown in FIG. 2. At this point, the engaging member 4k completely comes off the groove 4j of the travel amplifying piston 4b in the radial direction.

Figure 5:
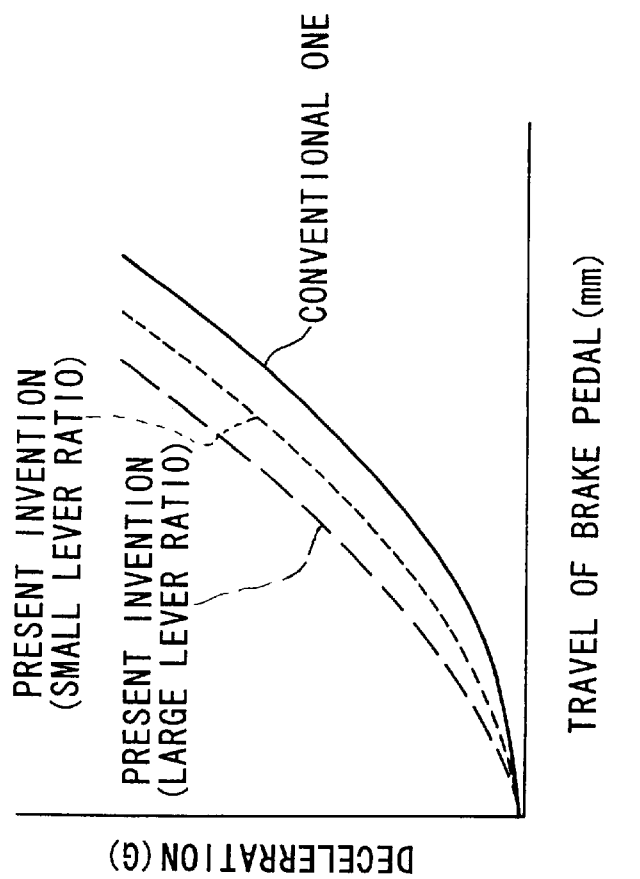
FIG. 5(a) is a diagram showing the relation between the input force applied by a brake pedal and the deceleration of a vehicle and FIG. 5(b) is a diagram showing the relation between the travel of the brake pedal and the deceleration of the vehicle, for comparison of characteristics of the idle stroke shortening device shown in FIG. 2 and characteristics of a conventional one.
Figure 5:
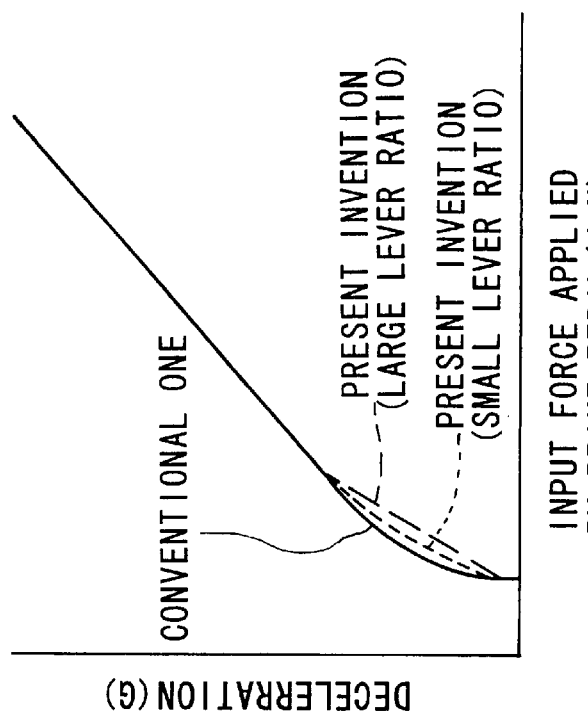

The characteristics in relation between the deceleration and the travel of the brake pedal in the idle stroke shortening device of the brake system of the first embodiment is shown in FIG. 5(b) in which large deceleration can be obtained by a shorter travel of the brake pedal in comparison to the conventional one, that is, the idle stroke is shortened. In this case, the larger the lever ratio of the travel amplifying mechanism 4 is, the shorter the idle stroke is.

According to the idle stroke shortening device of the first embodiment, the travels of the primary piston 5c and the secondary piston 5d are amplified relative to the travel of the brake pedal 2 by the travel amplifying mechanism 4 so that the idle stroke of the brake pedal 2, caused by idle strokes in the brake system from the master cylinder 5a to the wheel cylinders 6, can be shortened.

The shortening of the idle stroke improves the brake operation feeling. By suitably changing the lever ratio (amplifying ratio) of the lever 4d of the travel amplifying mechanism 4, the characteristics in relation between the input force applied by the brake pedal and the deceleration of the vehicle and/or the characteristics in relation between the travel of the brake pedal and the deceleration of the vehicle can be freely selected, thereby facilitating the operation for improving the brake feeling.

Since the idle stroke can be shortened, the foundation brake including the wheel cylinders 6 can be designed to have larger idle stroke, thereby suppressing energy loss caused by friction due to undesired contact between components of the brakes, such as brake friction pads, during the brakes are inoperative, improving fuel consumption and suppressing occurrence of judder, and further widening the range of selecting brake friction pads.

Since the travel amplifying mechanism 4 of the present invention employs only the lever 4d, two pistons 4a, 4b, and the engaging member 4k, the structure of the travel amplifying mechanism is relatively simple.

Figure 6:
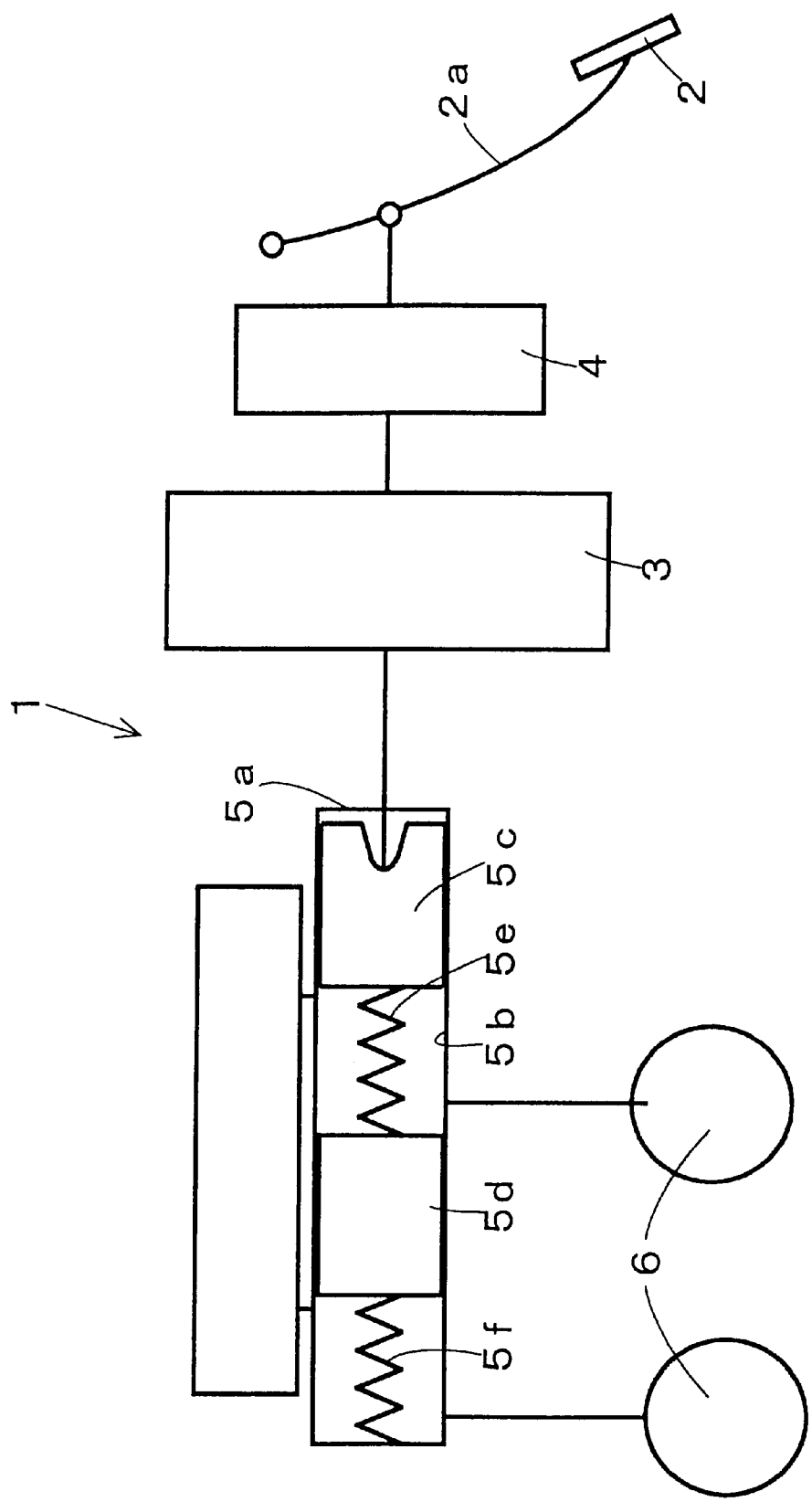
FIG. 6 is a view schematically showing another example of the basic structure of an idle stroke shortening device in a brake system according to the present invention.

FIG. 6 is a view schematically showing another example of the basic structure of an idle stroke shortening device in a brake system according to the present invention. In the description with regard to FIGS. 6 through 9(e), "front" corresponds to the left in any of the drawings and "rear" corresponds to the right in any of the drawings, contrary to the previous example. It should be noted that parts similar or corresponding to the parts of the previous example will be marked by the same reference numerals so that the description about the parts will be omitted.

Though the travel amplifying mechanism 4 is arranged between the booster 3 and the master cylinder 5 in the above example, a travel amplifying mechanism 4 is arranged between a brake lever 2a and a vacuum booster 3 according to the basic structure of the idle stroke shortening device of this example shown in FIG. 6.

Figure 7:
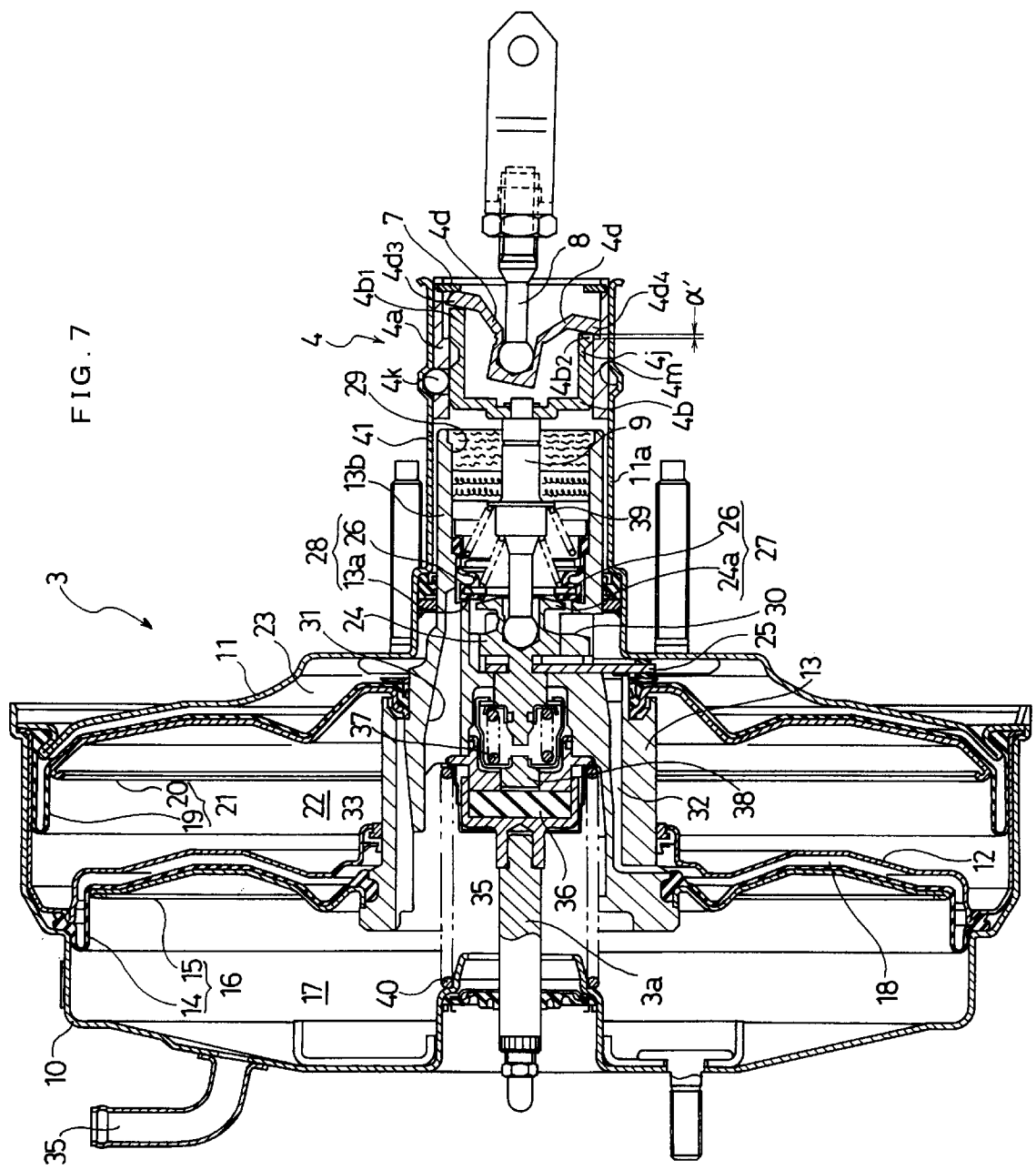
FIG. 7 is a sectional view schematically showing of an idle stroke shortening device of a second embodiment according to the present invention in the brake system shown in FIG. 6, schematically showing the device in a state that it is assembled to a vacuum booster and inoperative.

FIG. 7 is a sectional view schematically showing of an idle stroke shortening device of a second embodiment according to the present invention in the brake system shown in FIG. 6, schematically showing the device in a state that it is assembled to a vacuum booster and inoperative.

As shown in FIG. 7, the brake system with the idle stroke shortening device of the second embodiment includes the booster. The travel amplifying mechanism 4 of the idle stroke shortening device is arranged between an input rod 8 rotatably connected to the brake lever 2a and an operating rod 9 of the vacuum booster 3. The vacuum booster 3 may be, for example, a booster of a tandem-type disclosed in Japanese Patent Unexamined Publication H11-115734 and the details of the booster can be understood by reading the description of the above publication. Just a brief description will be made here. It should be noted that an atmosphere inlet, described later, of the booster is directly faced with the atmosphere because this booster is not provided with such a travel amplifying mechanism 4.

As shown in FIG. 7, the vacuum booster 3 comprises a front shell 10 and a rear shell 11 which constitute together a cylindrical vessel. A space surrounded by the both shells 10, 11 is divided into a front space and a rear space by a center plate 12. The front space is divided into a first constant pressure chamber 17 at the front side and a first variable pressure chamber 18 at the rear side by a front power piston 16 composed of a diaphragm 14 attached to a valve body 13 and a substantially plate-like piston member 15. On the other hand, the rear space is divided into a second constant pressure chamber 22 at the front side and a second variable pressure chamber 23 at the rear side by a rear power piston 21 composed of a diaphragm 19 attached to the valve body 13 and a substantially plate-like piston member 20. The valve body 13 is sealingly and slidably supported to the rear shell 11 and the center plate 12.

In the state shown in FIG. 7, the vacuum booster 3 is in the inoperative state in which a valve plunger 24 slidably fitted in the valve body 13 is in the rear-most position as illustrated where a key member 25 is in contact with the rear shell 11, and an operating rod 9 rotatably connected to the valve plunger 24 is in the rear-most position as illustrated. When the operating rod 9 and the valve plunger 24 are in the respective rear-most positions, an annular first valve seat 24a of the valve plunger 24 is in contact with a valve body 26 and the valve body 26 is spaced apart from an annular second valve seat 13a of the valve body 13. That is, an atmosphere valve 27 composed of the first valve seat 24a and the valve body 26 is closed and a vacuum valve 28 composed of the second valve seat 13a and the valve body 26 is opened.

In this inoperative state, the first and second variable pressure chambers 18, 23 are shut off from the atmosphere inlet 29 positioned at the rear end of a cylinder portion 13b of the valve body 13 and the second variable pressure chamber 23 communicates with the first constant pressure chamber 17 through a radial hole 30 of the valve body 13, the vacuum valve 28, and an axial hole 31 of the valve body 13, while the first variable pressure chamber 18 communicates with the first constant pressure chamber 17 through an axial hole 32 and the radial hole 30 of the valve body 13, the vacuum valve 28, and the axial hole 31 of the valve body 13. In addition, the second constant pressure chamber 22 always communicates with the first constant pressure chamber 17 through an axial hole 33 of the valve body 13. The first constant pressure chamber 17 always communicates with a negative pressure source not shown through a negative pressure inlet 34. Accordingly, in the inoperative state, the first and second constant pressure chambers 17, 22 and the first and second variable pressure chambers 18, 23 have the same negative pressure so that there is no differential pressure therebetween. Therefore, since no force produced by the differential pressure is applied to both the power pistons 16, 21, the power pistons 16, 21 do not move. This means that the vacuum booster 3 does not output force via the output shaft 3a.

From the inoperative state, as the operating rod 9 is moved forward by depression of the brake pedal 2 for braking operation, the valve body 26 comes in contact with the second valve seat 13a and the first valve seat 24a is separated from the valve body 26. That is, the vacuum valve 28 is closed and the atmosphere valve 27 is opened. Thus, the first and second variable pressure chambers 18, 23 are both shut off from the first constant pressure chamber 17, while the second variable pressure chamber 23 communicates with the atmosphere inlet 29 through the radial hole 30, the atmosphere valve 27, and an inner space of the cylindrical portion 13b of the valve body 13.

Accordingly, atmosphere is introduced into the first and second variable pressure chambers 18, 23 through the atmosphere inlet 29, thereby producing differential pressures between the first variable pressure chamber 18 and the first constant pressure chamber 17 and between the second variable pressure chamber 23 and the second constant pressure chamber 22, respectively. Because of the differential pressures, the first and second power pistons 16, 21 are moved forward and the valve body 13 is moved forward. The forward movement of the valve body 13 moves the output shaft 3*a* forward via a holder 35 and a reaction disk 36, so that the vacuum booster 3 outputs force. The forward movement of the output shaft 3*a* actuates a primary piston 5*c* of the master cylinder 5 not shown in the same manner as mentioned above and actuates a secondary piston 5*d* whereby the master cylinder 5 develops brake fluid pressure, actuating brakes.

On the other hand, the forward movement of the valve plunger 24 moves a plate plunger 38 via a spring 37 so that the plate plunger 38 comes in contact with the reaction disk 36. Therefore, the reaction force by the brake fluid pressure of the master cylinder 5 is transmitted to the brake pedal 2 not shown via the reaction disk 36, the plate plunger 38, the spring 37, the valve plunger 24, and the operating rod 9. In the present invention, however, since the travel amplifying mechanism 4 described later is provided, the reaction force is transmitted to the brake pedal 2 via the travel amplifying mechanism 4 and the input rod 8 after the operating rod 9.

In this vacuum booster 3, a servo ratio is variable in several levels by means of various behaviors of the reaction transmitting mechanism composed of the preset space between the plate plunger 38 and the valve plunger 24, the preset spring force of the spring 37, the preset space between the valve body 13 and the spring 37, the reaction disk 36 and the like. The varying operation for the servo ratio is disclosed in the aforementioned publication and can be understood by reading the description of the publication, so the detailed description will be omitted here.

As the brake pedal 2 is released, the operating rod 9 is moved rearward by the spring force of the spring 39 so as to close the atmosphere valve 27 and open the vacuum valve 28. Then, like the aforementioned inoperative state, the first and second variable pressure chambers 18, 23 are both shut off from the atmosphere and communicate with the first constant pressure chamber 17 via the vacuum valve 28 so that the atmosphere introduced into the first and second variable pressure chambers 18, 23 flows into the first constant pressure chamber 17 and further introduced to the negative pressure source through the negative pressure inlet 35. Since the differential pressure between the front sides and the rear sides of the first and second power pistons 16, 21, respectively, are thus reduced, the valve body 13, the first and second power pistons 16, 21 are moved rearward by the spring force of the return spring 40. The key member 25 comes in contact with the rear shell 11 to stop the rearward movement itself and, after that, stops the rearward movement of the valve body 13 and the valve plunger 24. In this way, the vacuum booster 3 becomes in the inoperative state shown in FIG. 7 and does not output anymore. Therefore, the master cylinder 5 becomes inoperative so that the brake fluid pressure die away, cancelling the brakes.

By the way, in the idle stroke shortening device of the second embodiment, the travel amplifying mechanism 4 is arranged within the cylindrical portion 11*a* extended rearward of the rear shell 11 and at the rear side of the valve body 13.

Figure 8:
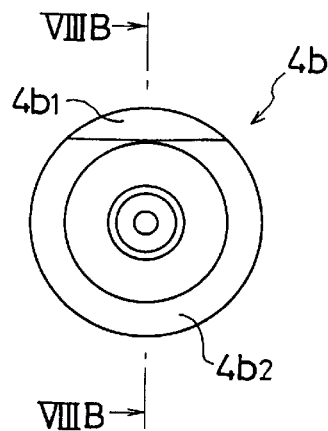
Figure 8:
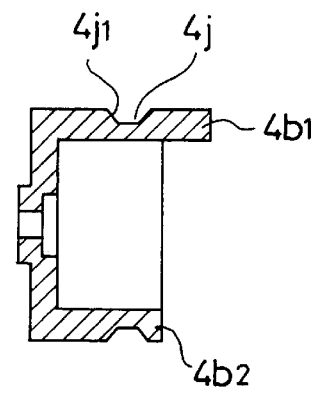
Figure 8:
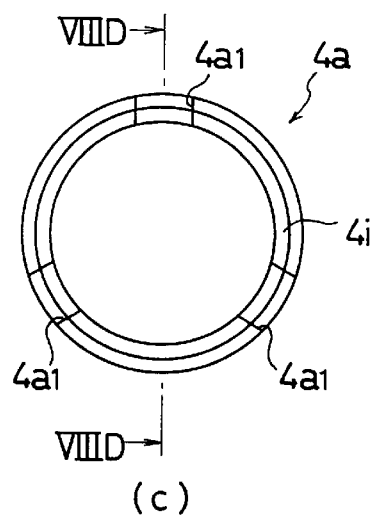
Figure 8:
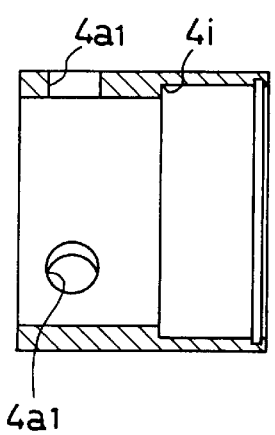
Figure 8:
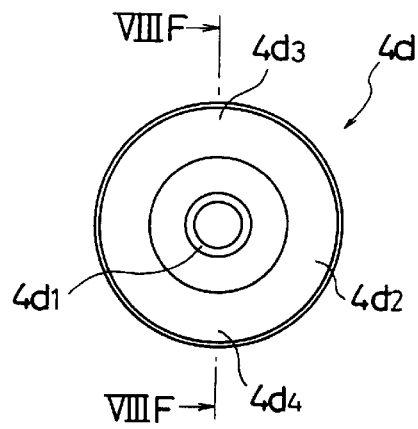
Figure 8:
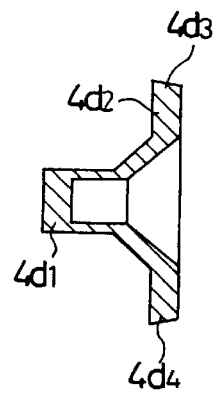
Figure 9:
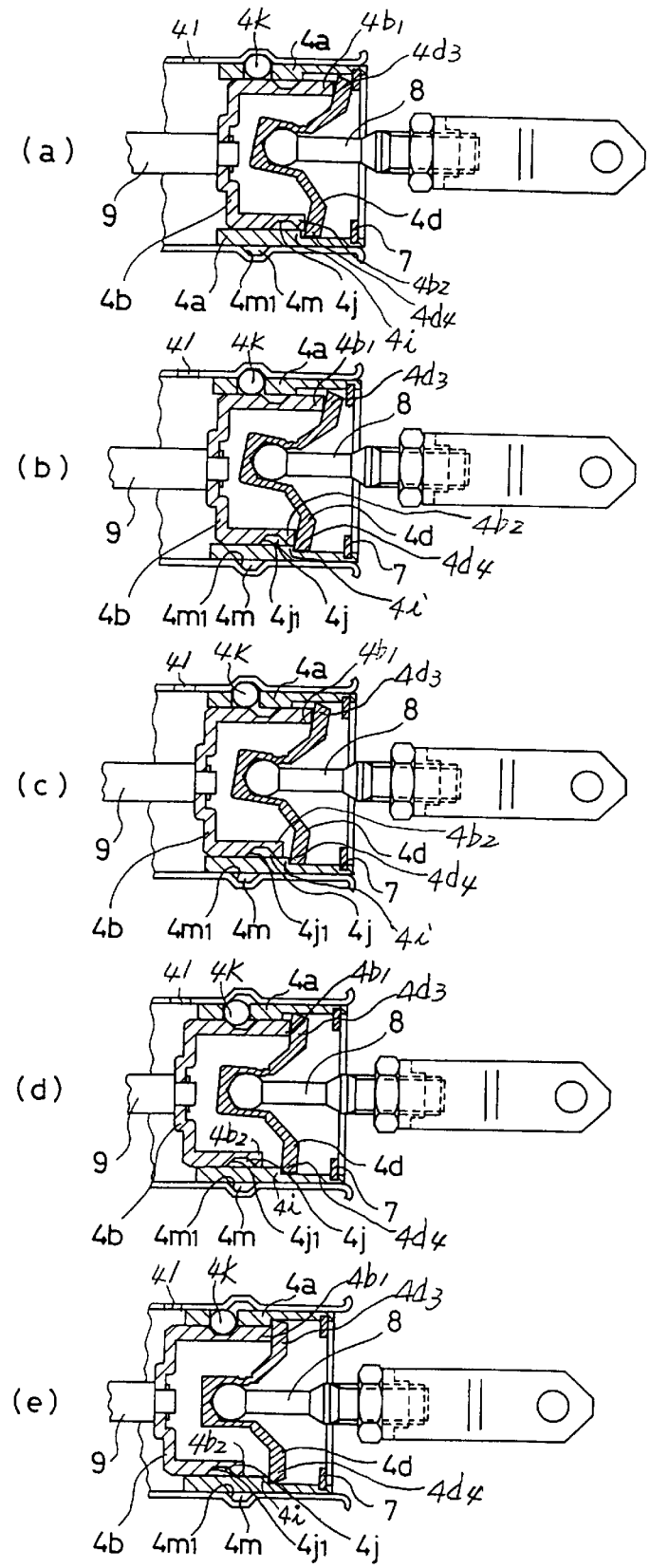
FIGS. 9(a)–9(e) are views for explaining the operation of the idle stroke shortening device of the second embodiment shown in FIG. 7.

The cylindrical portion 11*a* of the rear shell 11 is provided with a groove 4*m*, the same as the annular groove 4*m* of the first embodiment, formed in the inner surface thereof. As shown in FIGS. 8(*a*), 8(*b*), a travel amplifying piston 4*b* is formed in a bottomed cylindrical shape of which a portion projecting rearward is a first lever contact portion 4*b*₁. The cylindrical portion of the travel amplifying piston 4*b* is provided with a groove 4*j*, the same as the annular groove 4*j* of the first embodiment, formed in the outer surface thereof. As shown in FIG. 7, the operating rod 9 is connected to the bottom of the travel amplifying mechanism 4*b* so that the travel amplifying mechanism 4*b* and the operating rod 9 are integrally connected.

As shown in FIGS. 8(*c*), 8(*d*), a cylinder piston 4*a* is formed in a cylindrical shape. The cylindrical portion of the cylinder piston 4*a* is provided with a step or a stopper portion 4*i* formed in the inner surface thereof. The cylinder piston 4*a* is also formed with a predetermined number of radial holes 4*a*₁, spaced at predetermined intervals in the circumferential direction, in which ball-like engaging members 4*k* are loosely fitted in such a manner that the engaging members 4*k* can freely move in the radial direction.

The cylinder piston 4*a* is slidably fitted in the cylindrical portion 11*a* of the rear shell 11 and the travel amplifying piston 4*b* is slidably fitted in the cylinder piston 4*a*. When the ball-like engaging members 4*k* are engaged with the groove 4*m* as shown in FIG. 7, the cylinder piston 4*a* is locked with the cylindrical portion 11*a* so that the cylinder piston 4*a* can not move forward. On the other hand, when the ball-like engaging members 4*k* are engaged with the groove 4*j*, the cylinder piston 4*a* moves together with the travel amplifying piston 4*b*. In this manner, the engaging members 4*k* and the two grooves 4*j*, 4*m* constitute a cylinder piston control means 4*e*.

As shown in FIGS. 8(*e*), 8(*f*), a lever 4*d* comprises a bottomed cylindrical portion 4*d*₁, and a annular flange 4*d*₂ disposed at the rear end of the bottomed cylindrical portion 4*d*₁. As shown in FIG. 7, a sphere body at the front end of the input rod 8 is relatively rotatably fitted in the bottomed cylindrical portion 4*d*₁. The lever 4*d* is loosely fitted in the cylinder piston 4*a*. In this case, a flange 4*d*₂ of the lever 4*d* comes in contact with the step 4*i* of the cylinder piston 4*a*, thereby restricting the movement of the lever 4*d* relative to the cylinder piston 4*a* in the axial direction.

The travel amplifying mechanism 4 structured as mentioned above is assembled in the cylindrical portion 11*a* of the rear shell 11. In the inoperative state, the ball-like engaging members 4*k* enter in the groove 4*m* of the cylindrical portion 11*a* of the rear shell 11 and do not enter in the groove 4*j* of the travel amplifying piston 4*b* as shown in FIG. 7. Therefore, the cylinder piston 4*a* is blocked from moving in the axial direction and is in the rear-most position, while the travel amplifying piston 4*b* is allowed to slide relative to the cylinder piston 4*a*. The lever 4*d* is inclined relative to the travelling direction so that a rear end 4*d*₃ of the lever 4*d* is in contact with a stopper ring 7 fixed to the cylinder piston 4*a*, that is, the lever 4*d* is in the rear-most position. The first lever contact portion 4*b*₁ of the travel amplifying piston 4*b* is in contact with the rear end 4*d*₃ of the lever 4*d* being in contact with the stopper ring 7, that is, the travel amplifying piston 4*b* is in the rear-most position. At this point, as for the lever 4*d*, a rear end 4*d*₄ positioned at the opposite of the rear end 4*d*₃ about the center of the lever 4*d* is in contact with the second lever contact portion 4*b*₂ positioned at the opposite of the first lever contact portion 4*b*₁ about the center of the travel amplifying piston 4*b* whereby the inclination of the lever 4*d* is restricted in the traveling direction. In this state, there is a space α' between the stopper portion 4*i* of the cylinder piston 4*a* and the rear end 4*d*₄ of the lever 4*d* in the traveling direction. The space α' of the second embodiment constitutes the first preset value of the present invention and is set larger than a distance at which the lever 4d moves forward from the inoperative state until the atmosphere valve 27 is opened.

The atmosphere inlet 29 of the valve body 13 does not directly communicates with the atmosphere because of the existence of the travel amplifying mechanism 4 positioned in the rearward extended portion of the cylindrical portion 11a of the rear shell 11. For this, the cylindrical portion 11a is formed with an atmosphere connection hole 41 for always allowing the communication between the atmosphere inlet 29 and the atmosphere.

Hereinafter, description will now be made as regard to the operation of the idle stroke shortening device in the brake system according to the second embodiment structured as mentioned above.

In the inoperative state of the brake system, the travel amplifying mechanism 4 is in the inoperative state as shown in FIGS. 7 and 9(a) where the space α' exists between the stopper portion 4i of the cylinder piston 4a and the rear end $4d_4$ of the lever 4d.

The vacuum booster 3 is also in the inoperative state as shown in FIG. 7 where the vacuum valve 28 is opened and the atmosphere valve 27 is closed so that the first and second variable pressure chambers are both shut off from the atmosphere and communicate with the first contact pressure chamber via the vacuum valve 28. Accordingly, the pressures in the first and second variable pressure chambers are negative.

As the brake pedal 2 is depressed from this state for the braking operation, the input rod 8 connected to the brake pedal 2 moves forward. Then, the lever 4d, the travel amplifying piston 4b, and the operating rod 9 of the vacuum booster 3 move forward integrally so as to close the vacuum valve 28 and open the atmosphere valve 27. At this point, the lever 4d only moves forward without pivotal movement, so the travel amplifying mechanism 4 does not perform the stroke amplifying function. Since the engaging members 4k are engaged with the groove 4m of the cylindrical portion 11a of the rear shell 11, the cylinder piston 4a does not move. At this point, the space α' still exists because the space α'is set larger than a distance at which the lever 4d moves forward until the atmosphere valve 27 is opened.

As the atmosphere valve 27 is opened, the atmosphere is supplied into the second variable pressure chamber 23 through the atmosphere connection hole 41 formed in the cylindrical portion 11a of the rear shell 11, the atmosphere inlet 29 of the valve body 13, the inside of the cylindrical portion 13b, the atmosphere valve 27, and the radial hole 30, and further supplied into the first variable pressure chamber 18 through the axial hole 32 so that both the first and second power pistons 16, 21 of the vacuum booster 3 move forward whereby the vacuum booster 3 outputs via the output shaft 3a to start the boosting action.

As the input rod 8, the lever 4d, the travel amplifying piston 4b, and the operating rod 9 further move forward, the space α' does not exist and the rear end $4d_4$ comes in contact with the stopper portion 4i of the cylinder piston 4a as shown in FIG. 9(b) .

At a time point when the rear end $4d_4$ comes in contact with the stopper portion 4i, the engaging members 4k are still engaged with the groove 4m so that the cylinder piston 4a does not move even when pressed by the rear end $4d_4$ of the lever 4d. Therefore, as the input rod 8 further moves forward, the lever 4d pivots about the rear end $4d_4$ as a support for the pivotal movement in the counter-clockwise direction. By the pivotal movement, the rear end $4d_3$ of the lever 4d presses the travel amplifying piston 4b forward so that the travel amplifying piston 4b and the operating rod 9 further move forward and the second lever contact portion $4b_2$ of the travel amplifying piston 4b is separated from the lever 4d. At this point, the travel of the travel amplifying piston 4b is amplified at the lever ratio by the leverage of the lever 4d pivoting about the rear end $4d_4$ as the support. In this manner, the travel amplifying function of the travel amplifying mechanism 4 is started.

That is, in comparison to a normal conventional one without such a travel amplifying mechanism 4, the travel amplifying piston 4b and the operating rod 9 move a distance amplified by the travel amplifying mechanism 4 relative to the travel of the brake pedal 2.

As the lever 4d further pivots, the travel amplifying piston 4b further moves to reach such a position to allow the engaging members 4k to enter into the groove 4j of the travel amplifying piston 4b. At this position, since the cylinder piston 4a is pressed by the rear end $4d_4$ of the lever 4d and the engaging members 4k are pressed by the cylinder piston 4a, the engaging members 4k are guided by a front-side side wall $4m_1$ of the groove 4m of the cylindrical portion so as to gradually move in the radial inward direction of the cylinder piston 4a and thus gradually enter into the groove 4j of the of the travel amplifying piston 4b as shown in FIG. 9(d). As a result of this, the cylinder piston 4a gradually moves forward.

As the lever 4d further pivots in the counter-clockwise direction and the cylinder piston 4a further moves forward, the rear end $4d_3$ comes in contact with the stopper portion 4i as shown in FIG. 9(e) so as to cancelling the inclination of the lever 4d in the travelling direction. At this point, the engaging members 4k completely come off the groove 4m of the cylindrical portion and completely engage with the groove 4j of the travel amplifying piston 4b so as to allow the cylinder piston 4a and the travel amplifying piston 4b to integrally move forward. The travel amplifying function of the travel amplifying mechanism 4 is terminated.

As the structure that the cylinder piston 4a and the travel amplifying piston 4b move integrally after the travel amplifying function of the travel amplifying mechanism 4 is terminated, the engaging members 4k may be engaged with the groove 4j of the travel amplifying piston 4b and the bottomed cylindrical portion $4d_1$ of the lever 4d may be in contact with the bottom of the travel amplifying piston 4b.

As described above, according to the idle stroke shortening device of the second embodiment, the travel of the operating rod 9 of the vacuum booster 3 is amplified relative to the travel of the brake pedal 2 in comparison to the conventional one without travel amplifying mechanism 4 so that the travel of the output shaft 3a of the vacuum booster 3 is amplified relative to the travel of the brake pedal 2. Therefore, the travels of the primary piston 5c and the secondary piston 5d of the master cylinder 5 are also amplified relative to the travel of the brake pedal 2. Therefore, the idle stroke of a brake system from the master cylinder 5a to the wheel cylinders 6 can be cancelled by a relatively short travel of the brake pedal 2, thereby quickly actuating the brakes.

As the brake pedal 2 is released, the input rod 8 moves rearward so that the operating rod 9 is returned by the spring force of the spring 39. In the same manner as the aforementioned case of the travel amplifying mechanism 4 of the first embodiment, the travel amplifying piston 4b and the cylinder piston 4a integrally move rearward from the state as shown in FIG. 9(e). Then, as the engaging members 4k reach such a position that the engaging members 4k can enter into the groove 4m of the cylindrical portion 11a as shown in FIG. 9(d), the engaging members 4k are guided by the front-side side wall $4j_1$ of the groove 4j to gradually move in the radial outward direction of the cylinder piston 4a and gradually enter into the groove 4m according to the rearward movement of the travel amplifying piston 4b. As a result of this, the cylinder piston 4a gradually move rearward. Since the travel amplifying piston 4b moves rearward faster than the cylinder piston 4a, the lever 4d pivots about the rear end $4d_4$ in the clockwise direction in the figure.

As the travel amplifying piston 4b and the cylinder piston 4a further move rearward, as shown in FIG. 9(c), the engaging members 4k completely engage with the groove 4m and the cylinder piston 4a becomes in the rear-most position and stops so that only the travel amplifying piston 4b moves rearward together with the operating rod 9. As shown in FIG. 9(b), the second lever contact portion $4b_2$ of the travel amplifying piston 4b comes in contact with the lever 4d. As the travel amplifying piston 4b and the operating rod 9 further move rearward, the lever 4d stops from pivoting in the clockwise direction and moves rearward so that the rear end $4d_4$ is separated from the stopper portion 4i. As the travel amplifying piston 4b and the operating rod 9 further move rearward, the atmosphere valve 27 is closed and the vacuum valve 28 is opened so that the atmosphere in the first and second variable pressure chambers 18, 23 are discharged to the negative pressure source. By the spring force of the return spring 40, the valve body 13, the front power piston 16, the rear power piston 21, and the output shaft 3a move rearward together. At the same time, the primary piston 5c and the secondary piston 5d of the master cylinder 5 also move rearward.

As shown in FIG. 9(a), as the rear end $4d_3$ of the lever 4d comes in contact with the stopper ring 7 of the cylinder piston 4a, the lever 4d, the travel amplifying piston 4b, and the operating rod 9 are all in the respective rear-most positions. At this point, the space α' is created between the rear end $4d_4$ and the stopper portion 4i. In this manner, both the travel amplifying mechanism 4 and the vacuum booster 3 return to the inoperative state as shown in FIG. 7 and the master cylinder 5 also returns to the inoperative state, thus cancelling the brakes.

As mentioned above, in the idle stroke shortening device of the second embodiment, the travel amplifying function by the travel amplifying mechanism 4 is not started until the vacuum valve 28 is closed and the atmosphere valve is opened or until the control valves 27, 28 of the vacuum booster 3 composed of the atmosphere valve 27 and the vacuum valve 28 are switched. That is, the travel amplifying function for amplifying the travel of the brake pedal 2 is started after the control valves 27, 28 are switched. Therefore, even with the travel amplifying mechanism 4, before the control valves 27, 28 are switched, the input force applied by the brake pedal 2 is not amplified in the same manner as the case without the travel amplifying mechanism 4. Though the travel amplifying function by the travel amplifying mechanism 4 is not performed before the booster 3 starts to output via the output shaft 3a in the first embodiment, the travel amplifying function for amplifying the travel of the brake pedal 2 is started after the control valves 27, 28 are switched so that the longer travel of the output shaft 3a of the vacuum booster 3 than that of the first embodiment can be obtained even with the same travel of the brake pedal 2 in the second embodiment, thereby more effectively and quickly cancelling the idle stroke.

The characteristics in relation between the input force by the brake pedal and the deceleration of the vehicle in the idle stroke shortening device of the brake system of the second embodiment is substantially the same as that of the first embodiment as shown in FIG. 5(a). The characteristics in relation between the travel of the brake pedal and the deceleration of the vehicle in the second embodiment is also substantially the same as that of the first embodiment as shown in FIG. 5(b). Other works and effects of the idle stroke shortening device in the brake system of this second embodiment are also substantially the same as those of the first embodiment.

Though the brake system is provided with the vacuum booster 3 in the second embodiment, the brake system may be provided with a booster actuated by other power. Examples of such a booster include a hydraulic booster, a booster actuated by compressed air, and a booster actuated by electromagnetic force.

Figure 10:
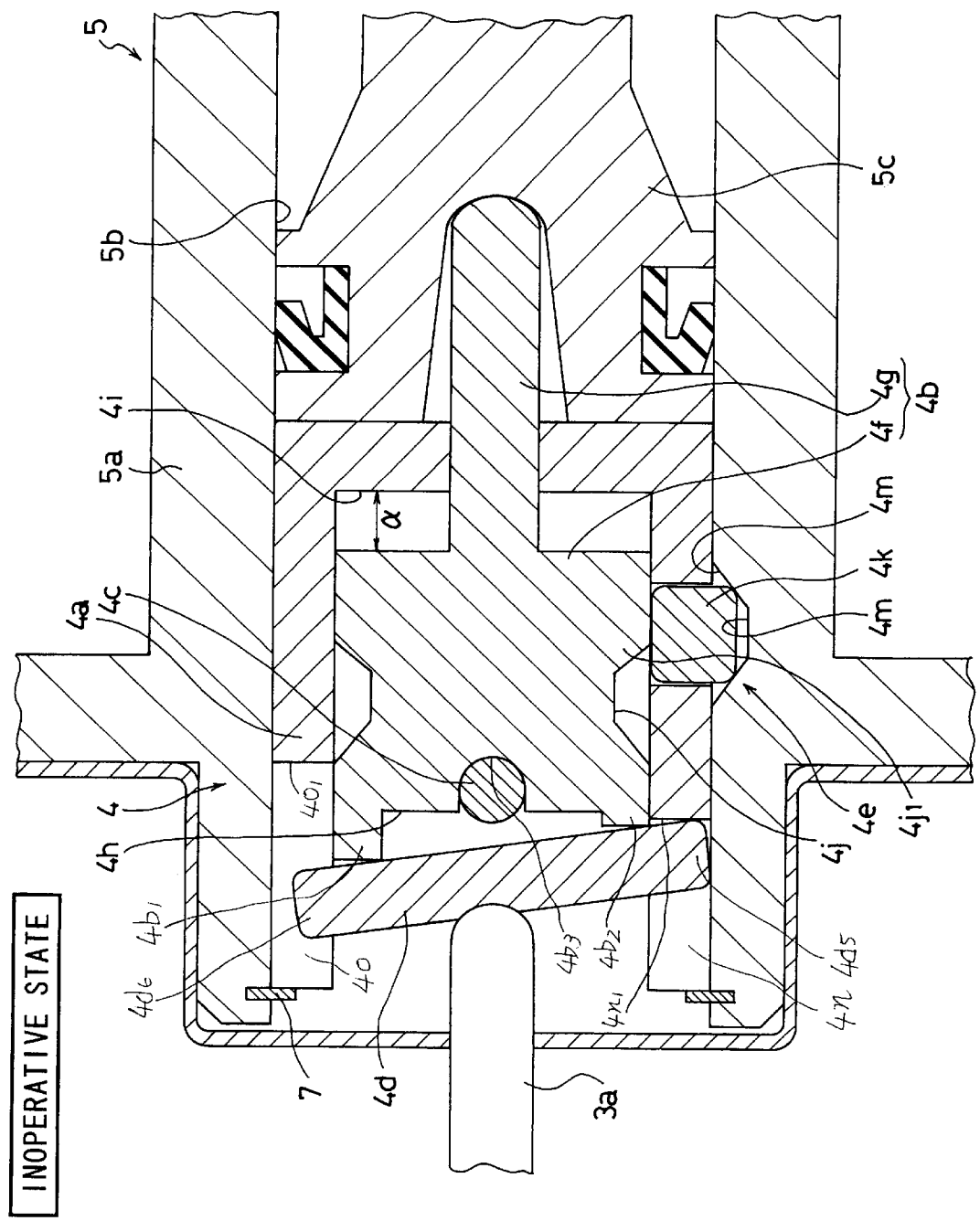
FIG. 10 is a partial sectional view schematically showing of an idle stroke shortening device of a third embodiment according to the present invention in the brake system shown in FIG. 1.

FIG. 10 is a partial sectional view schematically showing of an idle stroke shortening device of a third embodiment according to the present invention in the brake system shown in FIG. 1 and FIG. 11 is a partially sectional view schematically showing the idle stroke shortening device of the third embodiment in its operative state. It should be noted that parts similar or corresponding to the parts of the example will be marked by the same reference numerals so that the description about the parts will be omitted.

Though the lever 4d of the travel amplifying mechanism 4 is pivotally supported at its one end directly by the pin 4c bridging inside the cylinder piston 4a, the other end of the lever 4d is in contact with the rear end of the travel amplifying piston 4b, and the front end of the output shaft 3a of the booster 3 is in contact with the middle portion between the pin 4c and the contact portion with the travel amplifying piston 4b in the first embodiment, a lever 4d of a travel amplifying mechanism is not supported directly by a pin 4c in this third embodiment.

That is, as shown in FIG. 10 and FIG. 11, a cylinder piston 4a is formed with a groove-like first slit 4n having a predetermined length (depth) from the rear end of the cylinder piston 4a and is also formed with a groove-like second slit 4o at a side opposite to the side formed with the first slit 4n about the center of the cylinder piston 4a, wherein the length (depth) of the second slit 4o from the rear end of the cylinder piston 4a is longer than that of the first slit 4n. The first and second slits 4n, 4o are formed to have such a width (in the circumferential direction of the cylinder piston 4a) as to allow the lever 4d to be loosely fitted. When the lever 4d moves or rotates relative to the cylinder piston 4a, both ends $4d_5$, $4d_6$ of the lever 4d are guided by the first and second slits 4n, 4o, respectively.

One end $4d_5$ of the lever 4d is loosely fitted in the first slit 4n of the cylinder piston 4a in such a manner as to allow the relative movement and the relative rotation, while the other end $4d_6$ of the lever 4d is loosely fitted in the second slit 4o of the cylinder piston 4a in such a manner as to allow the relative movement and the relative rotation. In addition, the front end of the output shaft 3a of the booster 3 comes in contact with substantially the middle point of the lever 4d. A pin 4c is fixed to the cylinder piston 4a to extend through the center of the cylinder piston 4a in a direction perpendicular to the axis of the output shaft 3a. The pin 4c is disposed in front of the entire of the lever 4d. As described later, when the travel amplifying function of a travel amplifying mechanism 4 is terminated, the lever 4d comes in contact with the pin 4c at a point on the extension of the axis of the output shaft 3a.

A travel amplifying piston 4b is formed with a first lever contact portion $4b_1$ projecting rearward from the rear surface of the travel amplifying piston 4b and with a second lever contact portion $4b_2$ projecting rearward from the rear surface of the travel amplifying piston 4b, wherein the other end $4d_6$ of the lever comes in contact with the first lever contact portion $4b_1$ and the end $4d_5$ of the lever 4d comes in contact with the second lever contact portion $4b_2$. In this case, the projecting length of the first lever contact portion $4b_1$ is longer than the projecting length of the second lever contact portion $4b_2$. The second lever contact portion $4b_2$ may not project from the rear surface of the travel amplifying piston 4b, i.e. may be the same level of the rear surface of the travel amplifying piston 4b, in the same manner as the second embodiment. As clearly shown in FIG. 11, the rear surface of the travel amplifying piston 4b is formed with a groove $4b_3$ having a U-like section in which the pin 4c is fitted.

In the inoperative state shown in FIG. 10, the rear end of the cylinder piston 4a is in contact with a stopper ring 7, i.e. the cylinder piston 4a is in the rear-most position, just like the aforementioned first embodiment. The groove 4b3 of the travel amplifying piston 4b is fitted onto and in contact with the pin 4c, i.e. the travel amplifying piston 4b is also in the rear-most position. In this inoperative state, a space α exists between the cylinder piston 4a and the travel amplifying piston 4b just like the first embodiment. Further in the inoperative state, the end $4d_5$ of the lever 4d is in contact with the bottom $4n_1$ of the first slit 4n formed in the cylinder piston 4a while the other end $4d_6$ is in contact with the first lever contact portion $4b_1$ of the travel amplifying piston 4b. In this state, the other end $4d_6$ is spaced largely apart from the bottom 4oof the second slit 4o formed in the cylinder piston 4a. In this third embodiment, the end $4d_5$ of the lever 4d may be set not to come in contact with the second lever contact portion $4b_2$ either in the inoperative state or in the operative state.

Other structures of the idle stroke shortening device of the third embodiment are the same as those of the first embodiment.

Hereinafter, description will now be made as regard to the operation of the idle stroke shortening device according to the third embodiment structured as mentioned above.

As the brake pedal 2 is depressed from the state shown in FIG. 10 for the braking operation, the booster 3 is actuated just like the first embodiment, so the output shaft 3a presses the lever 4d forward. Then, the lever 4d pivots about the contact point between the end $4d_5$ of the lever 4d and the bottom 4nof the first slit 4n as a support in the clockwise direction in FIG. 10 so that the travel amplifying piston 4b moves forward, thereby starting the travel amplifying function of the travel amplifying mechanism 4. At this point, the cylinder piston 4a does not move at all and is held in the stopping state.

The space α is killed by the forward movement of the travel amplifying piston 4b so that the travel amplifying piston 4b comes in contact with the cylinder piston 4a in the axial direction. Accordingly, the pin 4c comes off the groove $4b_3$ and the lever 4d comes in contact with the pin 4c at a point on the extension of the axis of the output shaft 3a. At this point, an input force applied mainly by the output shaft 3a and a reaction force from the pin 4c are exerted on the lever 4d in the axial direction of the output shaft 3a, so reaction forces from the cylinder piston 4a and the travel amplifying piston 4b are completely or nearly not exerted on the both ends of the lever 4d. Therefore, a bending load is nearly not applied to the lever 4d. In the same manner as the first embodiment, at a point when the space α is killed, the travel amplifying function of the travel amplifying mechanism 4 is terminated and the engaging member 4k is allowed to engage with the groove 4j of the travel amplifying piston 4b.

As the output shaft 3a further moves forward, the output shaft 3a presses the pin 4c via the lever 4d so that the cylinder piston 4a moves forward integrally with the travel amplifying piston 4b and the engaging member 4k comes off the groove 4m of the housing 5a and engages with the groove 4j just like the first embodiment. In this way, the brake system becomes in the operative state shown in FIG. 11.

As the brake pedal 2 is released, the booster 3 does not output and the output shaft 3a moves rearward so that cylinder piston 4a are moved rearward integrally with the travel amplifying piston 4b so that the rear end of the cylinder piston 4a comes in contact with the stopper ring 7 and thus stops. In this state, the engaging member 4k is allowed to engage with the groove 4m of the housing 5a. As the output shaft 3a further moves rearward, the travel amplifying piston 4b moves rearward so that the engaging member 4k comes off the groove 4j and engage with the groove 4m in the same manner as the first embodiment. Finally, the bottom of the groove $4b_3$ of the travel amplifying piston 4b comes in contact with the pin 4c, stopping the travel amplifying piston 4b. In this way, the brake system becomes in the inoperative state as shown in FIG. 10.

Other works of the idle stroke shortening device of this third embodiment are substantially the same as that of the first embodiment.

According to the idle stroke shortening device of the third embodiment, the length from the support of the lever 4d (the contact portion between the end $4d_5$ of the lever 4d and the bottom $4n_1$ of the first slit 4n of the cylinder piston 4a) to the point of action for the output shaft 3a of the lever 4d, and the length from the support of the lever 4d and the contact portion between the other end $4d_6$ of the lever 4d and the rear end of the travel amplifying piston 4b are both longer than those of the first embodiment, reducing irregularity in the travel amplifying ratio.

Even when force from the output shaft 3a is applied to the lever 4d, no bending load is exerted on the lever 4d. Therefore, large bending strength is not required for the lever 4d.

Other works and effects of the idle stroke shortening of this third embodiment are also substantially the same as those of the first embodiment.

Though any one the idle stroke shortening devices according to the respective embodiments shown in FIG. 1, FIG. 6, and FIG. 7 is applied to the brake system with the booster 3 in the above description, the idle stroke shortening device of the present invention can be applied to a brake system without booster 3.

With the travel amplifying mechanism 4, while the travel can be amplified by the leverage in the travel amplifying mode, larger input for the leverage should be required. Since larger input in the travel amplifying mode is required in the initial stage where relative small input is necessary, thus not particularly affecting the braking operation. However, to improve pedaling feeling, jumping characteristics by the booster 3 for lightening the pedal reaction at the initial stage where idle strokes exist is employed so as to help the pedaling when the travel amplifying mechanism 4 is in the amplifying mode, i.e. in the initial stage. The booster 3 having this jumping characteristics is conventionally well known. As an example of such a booster, there is a hydraulic brake booster disclosed in Japanese Unexamined Utility Model Publication No. H05-84553. Therefore, the description of the jumping characteristics will be omitted.

As apparent from the above description, according to the idle stroke shortening device in the brake system of the present invention, the travel of the operating member is amplified by the travel amplifying mechanism and is then transmitted to the master cylinder in the initial stage of operation, whereby the idle stroke of the operating member caused by various idle portions of strokes in the brake system can be effectively shortened.

The shortening of the idle stroke improves the brake operational feeling. The characteristics in relation between the input force applied by the brake pedal and the deceleration of the vehicle and/or the characteristics in relation between the travel of the brake pedal and the deceleration of the vehicle can be freely changed by suitably selecting the amplifying ratio of the travel amplifying mechanism, thereby facilitating the operation for improving the brake feeling.

Since the idle stroke can be shortened, the foundation brake including the wheel cylinders can be designed to have larger idle stroke than that of the conventional one, thereby suppressing energy loss caused by friction due to undesired contact between components of the brakes, such as brake friction pads, during the brakes are inoperative, improving fuel consumption and suppressing occurrence of judder, and further widening the range of selecting brake friction pads.

Particularly, according to the present invention, the travel amplifying mechanism can be relatively simply structured just by using a lever, two pistons, and an engaging member.

In addition, according to the present invention, the function of amplifying the travel of the operating member by the travel amplifying mechanism is not started until the control valve of the booster is switched and is started after the control valve is switched. Therefore, the force required for operating the brake pedal is not increased until the control valve is switched, thus preventing heavy operation of the brake pedal.

What is claimed is:

1. An idle stroke shortening device in a brake system including an operating member, a master cylinder which is actuated by operation of the operating member to develop master cylinder pressure, and a brake cylinder which develops braking force when the master cylinder pressure is introduced into the brake cylinder, said idle stroke shortening device comprising a travel amplifying mechanism arranged between said operating member and said master cylinder, wherein the travel of said operating member is transmitted to said master cylinder after amplified by said travel amplifying mechanism.

2. An idle stroke shortening device as claimed in claim 1, wherein the brake system includes a booster arranged between said operating member and said master cylinder to boost input force applied by said operating member and output the boosted force to said master cylinder, and wherein said travel amplifying mechanism is arranged between said booster and said master cylinder.

3. An idle stroke shortening device as claimed in claim 1, wherein said travel amplifying mechanism comprises:

a cylindrical cylinder piston which is slidably fitted in an axial hole of said master cylinder;

a travel amplifying piston which is slidably fitted in said cylinder piston to press an output piston of said master cylinder;

a lever which either is supported to said cylinder piston in such a manner as to pivot forward when the travel amplifying mechanism is operative and to pivot rearward when the travel amplifying mechanism is inoperative about one end thereof as a support, or is supported to said cylinder piston in such a manner as to pivot forward about one end as a support after moving forward a first preset travel relative to said cylinder piston when the travel amplifying mechanism is operative and to move rearward for said first preset travel relative to said cylinder piston after pivoting rearward about the end when the travel amplifying mechanism is inoperative, wherein the other end of the lever is in contact with an rear end of said travel amplifying piston and wherein output of said booster is applied to a portion between said one end and said the other end; and a cylinder piston control means which engages said cylinder piston with an inner wall of said axial hole for the slidable fitting of said cylinder piston to block the movement of said cylinder piston when it is in the inoperative position and releases the blockage of the movement of said cylinder piston when said travel amplifying piston moves a second preset travel relative to said cylinder piston.

4. An idle stroke shortening device as claimed in claim 1, wherein the brake system includes a booster arranged between said operating member and said master cylinder to boost input force applied by said operating member and output the boosted force to said master cylinder, and wherein said travel amplifying mechanism is arranged between said operating member and said booster.

5. An idle stroke shortening device as claimed in claim 4, wherein said travel amplifying mechanism comprises:

a cylindrical cylinder piston which is slidably fitted in an axial hole of said booster;

a travel amplifying piston which is slidably fitted in said cylinder piston and is connected to an operating rod for switching and controlling the control valve of said booster;

a lever which either is supported to said cylinder piston in such a manner as to pivot forward when the travel amplifying mechanism is operative and to pivot rearward when the travel amplifying mechanism is inoperative about one end thereof as a support, or is supported to said cylinder piston in such a manner as to pivot forward about one end as a support after moving forward a first preset travel relative to said cylinder piston when the travel amplifying mechanism is operative and to move rearward for said first preset travel relative to said cylinder piston after pivoting rearward about the end when the travel amplifying mechanism is inoperative, wherein the other end of the lever is in contact with a rear end of said travel amplifying piston and wherein input force applied by said operating member is applied to a portion between said one end and said the other end; and a cylinder piston control means which engages said cylinder piston with an inner wall of said axial hole for the slidable fitting of said cylinder piston to block the movement of said cylinder piston when it is in the inoperative position and releases the blockage of the movement of said cylinder piston when said travel amplifying piston moves a second preset travel relative to said cylinder piston.

6. An idle stroke shortening device as claimed in claim 5, wherein said first preset travel is set larger than the travel of said operating rod until the control valve of said booster is switched.

7. An idle stroke shortening device as claimed in claim 3, wherein said cylinder piston control means comprises an engaging member radially movably supported in said cylinder piston and a groove formed in the inner wall of said axial hole, wherein said engaging member in the inoperative position is disposed between said cylinder piston and said groove to block the movement of said cylinder piston and, when said travel amplifying piston moves said second preset travel relative to said cylinder piston, said engaging member moves radially to come off said groove, thereby releasing the blockage of the movement of said cylinder piston.

* * * * *